United States Patent [19]

Mathis

[11] Patent Number: 5,123,338

[45] Date of Patent: Jun. 23, 1992

[54] APPARATUS FOR REGULATING THE DENSITY OF FODDER BALES

[75] Inventor: Michel H. Mathis, Challans, France

[73] Assignee: Hesston Braud, Coex, France

[21] Appl. No.: 487,662

[22] Filed: Mar. 2, 1990

[30] Foreign Application Priority Data

Mar. 3, 1989 [FR] France .................. 89 02832

[51] Int. Cl.⁵ .................................... B30B 15/26
[52] U.S. Cl. ........................... 100/43; 56/341; 100/192
[58] Field of Search ............ 100/43, 50, 179, 189, 100/191, 192; 56/341

[56] References Cited

U.S. PATENT DOCUMENTS

| | | | |
|---|---|---|---|
| 2,582,672 | 1/1952 | Bobst | 100/192 X |
| 3,070,006 | 12/1962 | Raney et al. | 100/192 |
| 3,179,040 | 4/1965 | Seltzer | 100/192 X |
| 3,467,000 | 9/1969 | Seltzer | 100/192 X |
| 3,479,950 | 11/1969 | Freeman | 100/192 X |
| 4,132,164 | 1/1979 | White | 100/189 |
| 4,148,254 | 4/1979 | Graber et al. | 100/192 X |
| 4,166,414 | 9/1979 | Fleming et al. | 100/192 X |
| 4,168,659 | 9/1979 | Yatcilla et al. | 100/43 |
| 4,565,123 | 1/1986 | Sanders | 100/192 |
| 4,627,341 | 12/1986 | Sudbrack et al. | 100/191 X |

Primary Examiner—Harvey C. Hornsby
Assistant Examiner—Stephen F. Gerrity
Attorney, Agent, or Firm—Bryan Cave

[57] ABSTRACT

An apparatus is provided for regulating the density of parallelepipedic bales of fodder produced in a bale press. The apparatus includes a compression canal formed by side walls in which a main plunger is driven in reciprocating motion by a power transmission device. The side walls of the canal include at least one pivoting shutter plate controlled by a fluid cylinder. The bale press includes a device for detecting the compression force applied by the plunger on a fodder charge present in the compression canal.

4 Claims, 3 Drawing Sheets

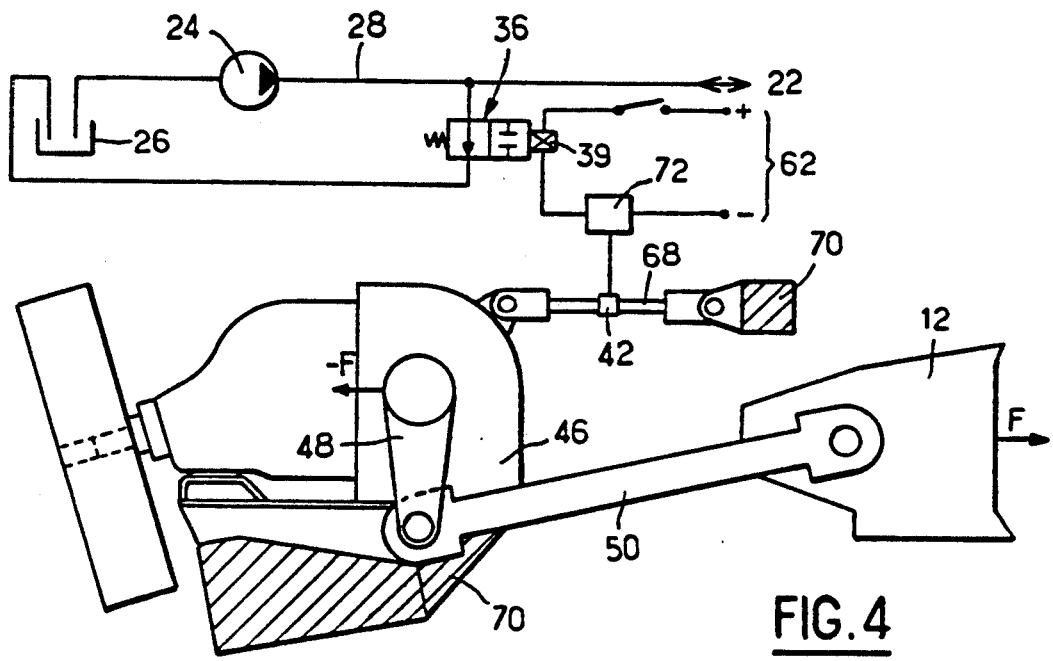
FIG.4
FIG.5
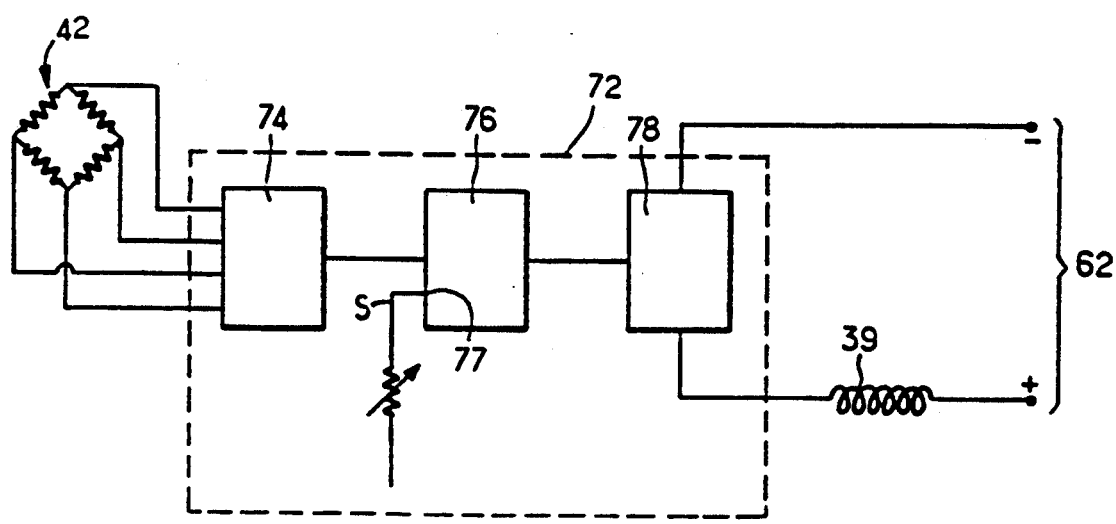

APPARATUS FOR REGULATING THE DENSITY OF FODDER BALES

FIELD OF THE INVENTION

The present invention relates to a method and apparatus for regulating the density of parallelepipedic fodder bales produced by a bale press.

BACKGROUND OF THE INVENTION

In a bale press for producing parallelepipedic fodder bales, such as described in U.S. Pat. No. 4,132,164, a fodder charge is compressed by a main plunger driven in reciprocating movement within a compression canal. Fodder slugs are fed into the compression canal through a lateral conduit while the plunger is retracted. The slugs are then compressed by the plunger between the forward face of the plunger and a fodder charge already in the compression canal. The fodder charge already in the compression canal serves as an "anvil" for the plunger. A compression force is exerted on the fodder slug. The compression force is directly related to the force necessary to drive the bale through the compression canal, and is equal to the longitudinal retention forces that result from the friction between the bale and the compression canal inner walls.

In such an operation, however, the friction forces and therefore the retention of the bale may vary greatly. This will result in an unequal compression and non-homogenity of bales.

A device for producing a homogeneous bale by regulating compression force is known from U.S. Pat. No. 4,168,659. The walls of the compression canal in that device are partially formed of pivotable plates pressed against the outer surfaces of the fodder bale. The plates are pushed by variable transversal forces to produce a variable longitudinal retention force. The compression force is a function of the transversal forces. The plunger force is in balance with the force required to slide the bale through the canal. The force required to slide the bale depends on the transversal forces applied by the plates and on the coefficient of friction which relates the transversal or normal forces to the longitudinal force. A dynamic force also exists in such a device due to the acceleration of fodder mass in the canal.

The principal object of a bale press is to optimally compress the fodder according to the user's criteria. A continuous and regular density must be attained, implicitly requiring a continuous and regular force by the compression plunger. During the operation of a bale press many factors may influence the coefficient of friction between the fodder and the compression canal (e.g., humidity, type of product). The forces exerted by the plunger may also vary greatly at a particular work site.

In U.S. Pat. No. 4,168,659, pivotable plates are actuated by hydraulic cylinders. The main plunger comprises a connecting rod eccentricly mounted and cooperating with a piston-cylinder group to provide fluid under pressure to the cylinders and to provide pilot pressure to a regulating valve. The pilot pressure is a function of the compression force applied by the main plunger.

Such an arrangement, however, has several drawbacks. Firstly, the system is incapable of reacting immediately if the compression force is too small. One or more reciprocal plunger strokes are required to increase the pressure in the cylinders of the pivotable plates during which time successive fodder slugs are insufficiently compressed.

Secondly, the cylinder may become excessively discharged if the regulation is poorly adjusted or becomes unadjusted.

Finally, the system suffers from considerable hysteresis leading to relatively long response times because the piston-cylinder group associated with the eccentric mounting of the main plunger connecting rod functions as both a fluid source and a pressure detector. Thus, the actual compression applied by the main plunger can greatly exceed the desired threshold before the spool of the regulating valve responds to discharge the cylinder.

SUMMARY OF THE INVENTION

In order to overcome such drawbacks, the present invention proposes a method and apparatus for regulating the density of parallelepipedic fodder bales produced by a bale press. The apparatus includes a compression canal having walls wherein a main plunger is driven in reciprocating movement by transmission means, the walls of said canal comprising at least one pivoting shutter plate controlled by a fluid cylinder; means for detecting a cyclical compression force applied by the main plunger on a load of fodder present in the compression canal, said means adapted to produce a signal as a function of the cyclical compression force; and a hydraulic circuit operationally connected to said fluid cylinder and to said compression force detection means.

The method includes the steps of producing a continuous flow of fluid under pressure; permanently delivering said pressurized fluid to said fluid cylinder; and diverting a portion of said fluid flow when the compression force detection means produces a signal exceeding an adjustable predetermined threshold.

Also according to this invention, said hydraulic circuit produces a bale retention force prior to the compression of the fodder in each cycle of the plunger. The bale retention force corresponds to a signal level from said compression force detecting means when the signal level is greater than the predetermined threshold. The desired compression force corresponding to the predetermined signal threshold for the detecting means is immediately applied during the compression of the fodder in each operation cycle of the plunger.

BRIEF DESCRIPTION OF THE DRAWINGS

Further details and advantages of the invention will become apparent in the following description, in which reference is made to the annexed drawings.

FIG. 4 shows a further embodiment in which the regulating valve is electronically controlled.

FIG. 5 is a block diagram of an electronic circuit suitable for the embodiment of FIG. 4.

DETAILED DESCRIPTION OF THE INVENTION

Figure 1:
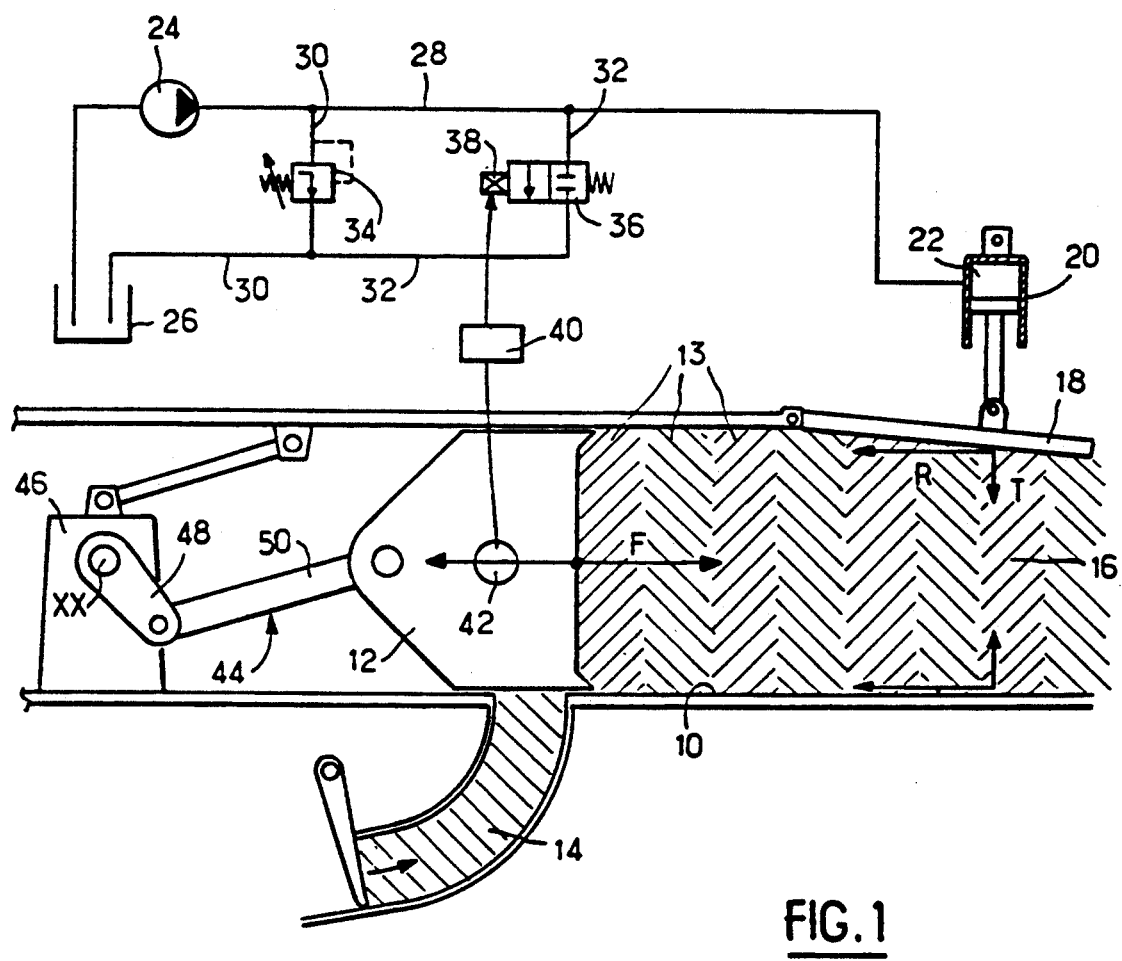
FIG. 1 is a diagrammatical longitudinal sectional view of a bale press and a corresponding hydraulic circuit for regulating bale density.

FIG. 1 shows a bale press compression canal 10. The other elements of the bale press have been simplified or omitted for simplicity. A complete description of a bale press of the type represented in FIG. 1 is found in U.S. Pat. No. 4,132,164.

A main plunger 12 slides in reciprocating movement within the compression canal to compress successive slugs 13 of fodder. The slugs of fodder enter through a lateral conduit 14 and form a parallelepipedic bale 16. With each advance of the plunger 12, a compressive force F is applied on the bale which varies as a function of the friction between the bale and the canal walls 10. To vary the frictional forces and thereby regulate the compression force, the canal walls include at least one pivoting shutter plate 18 controlled by a fluid cylinder 20. The shutter plate applies a transversal or normal force T on at least an outer zone of the bale. This transversal force is transformed by the coefficient of friction between the bale and the shutter plate into a longitudinal force R which tends to resist the advancement of the bale 16.

In accordance with this invention, the chamber 22 of the cylinder 20 is connected to a hydraulic circuit constructed as follows. A pump draws fluid from a low pressure reservoir 26 and pumps it into a high pressure conduit 28 connected to the cylinder chamber 22. There are provided two branch lines 30 and 32 between the output port of the pump 24 and the cylinder. The first branch line 30 leads to a conventional pressure relief valve 34 which is preferably adjustable. The pressure relief valve maintains a fluid pressure within the high pressure conduit 28 at a predetermined maximum level which is at least as high as the system regulation pressure. Branch line 30 leads back to the fluid reservoir downstream of the relief valve.

The second branch line 32 leads to a two-way, two position hydraulic control valve 36. The control valve is spring biased in a closed position that prohibits flow. The control valve is actuated by an actuator 38 into an open position that allows flow. Line 32 leads back to the fluid reservoir 26 downstream of this control valve.

The valve actuator 38 is controlled by a control unit 40 which is operatively connected to a compression force detector 42 mounted directly or indirectly on the plunger 12 and/or on the plunger transmission group. In the illustrated example, the transmission group includes a motor/reducer 46. The output axis XX of the motor/reducer 46 drives a crank 48 and a connecting rod 50 which is mounted between the distal end of the crank and a central portion of the plunger.

Figure 2:
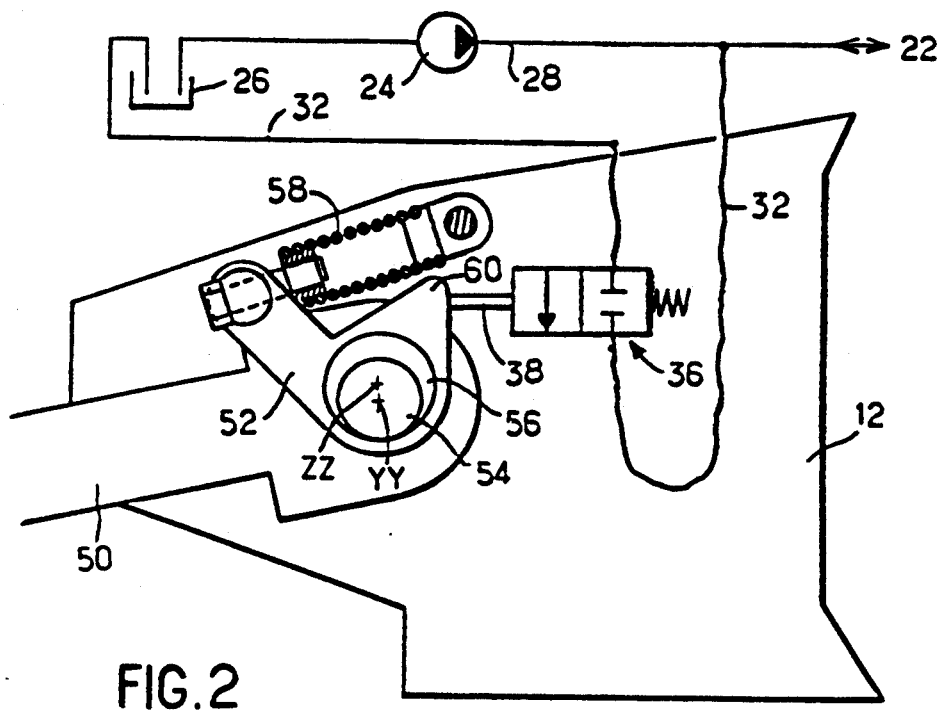
FIG. 2 shows an embodiment of the invention in which the regulating valve is mechanically operated.

According to a first embodiment of the invention shown in FIG. 2, the control valve 36 and the associated actuator 38 are mounted on the plunger 12. The force detector 42 and the control unit are of a purely mechanical, eccentric construction. A detector lever 52 comprises two pivot pins 54 and 56, having rotational axes YY and ZZ, respectively. The pivot pins are slightly offset to one another, and one pin 54 cooperates with the plunger 12 while the other pin 56 cooperates with the transmission connecting rod 50. A spring 58 is between lever arm 52 and the plunger 12, and is offset a certain distance from pivot pins 54 and 56. The lever 52 tilts (toward the right) when the tilting moment exerted by the connecting rod 50 on the lever 52 (toward the right) exceeds the resisting moment applied by the spring 58 on the lever 52 (toward the left).

The control valve 36 is mounted facing the lever 52. When the spring 58 is maintaining the lever in its non-tilted position, the control valve is in a closed position with its actuator 38 simply resting against lever 52 or against a protrusion 60 integral therewith. As lever 52 tilts (toward the right) control valve 36 is forced into an open position by displacement of actuator 38. The high pressure conduit 28 and the cylinder chamber 22 are consequently open to the reservoir 26. The pressure in the cylinder chamber is reduced. Accordingly, the transversal force T applied by the shutter plate 18 and the resulting longitudinal resisting force R applied against the bale are reduced. The compression force F is thus reduced until the spring 58 of the eccentric detector urges the lever 52 (toward the left), causing the control valve to close.

It will be noted that the cylinder 20 is continuously supplied with fluid under a pressure determined by the relief valve 34. The cylinder 20 exerts a constant transversal force on the bale 16. It is only when the eccentric detector tilts due to excessive compression force F that the cylinder is discharged to reduce the transversal force until the compression force drops below the threshold.

The first embodiment is relatively simple and reliable, as long as the control valve 36 is ruggedly constructed and connected by fatigue resistant flexible conduits, because the valve is subjected to the same reciprocating movement as the plunger 12.

Figure 3:
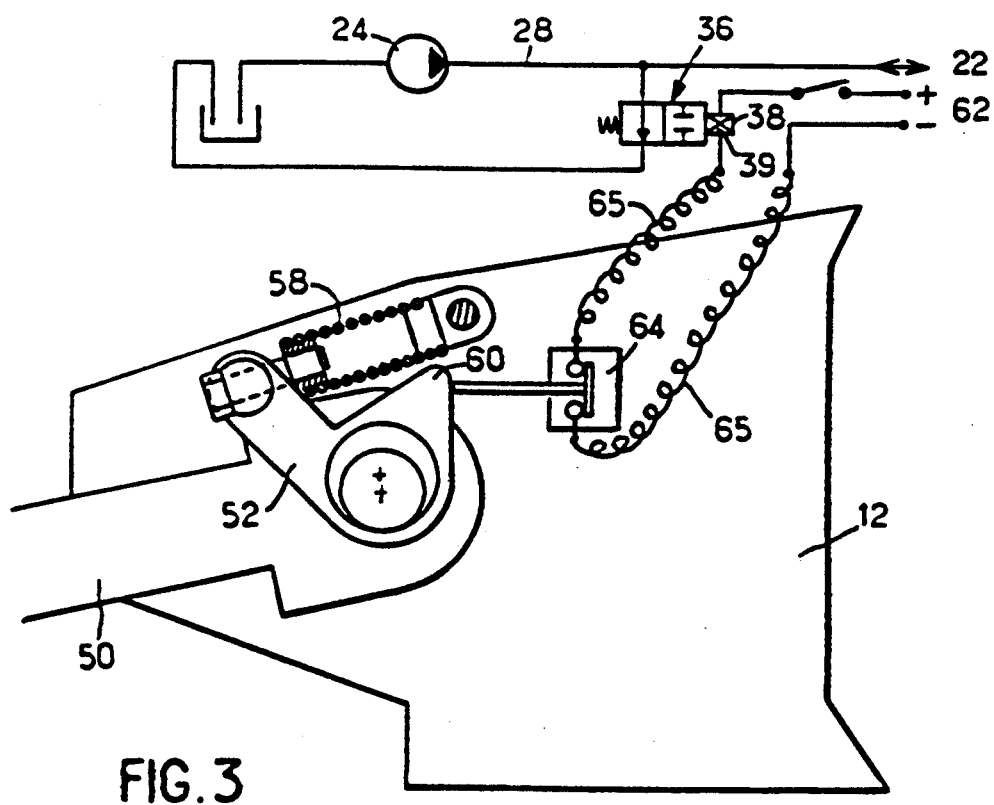
FIG. 3 shows an embodiment of the invention in which the regulating valve is electromechanically operated.

In the second embodiment of the invention shown in FIG. 3, the control valve 36 is stationarily mounted relative to the press. As in the first embodiment, an eccentric detector is provided between the plunger 12 and the transmission 44.

The actuator 38 for the control valve 36 comprises an electric coil 39 supplied with current from an electrical source such as a tractor battery. The current is supplied through an electrical circuit which includes a switch 64. The switch 64 is fixed to the plunger 12 in facing relation to lever 52 or to protrusion 60 integral therewith, in a position corresponding to the position of the control valve in the first embodiment.

Switch 64 may be normally open or normally closed. A normally open switch remains open while the lever 52 is in a non-tilted, rest position. The coil 39 remains non-energized and the control valve remains closed so that the cylinder chamber is supplied with high pressure fluid. When the lever 52 is tilted (toward the right), the switch 64 closes and the coil 39 becomes energized. The control valve opens, reducing the pressure in the cylinder.

FIG. 3 depicts an embodiment of the present invention where the switch is normally closed. Switch 64 remains closed when lever 52 is in a rest position. The coil 39 is energized to maintain the control valve 36 in a closed position. The control valve is reverse acting compared to the previous examples. As with the previous examples, the cylinder chamber 22 is normally supplied with high pressure fluid. When lever 52 is tilted (toward the right) the switch opens, the coil becomes de-energized, and the control valve opens reducing the pressure in the cylinder.

The second embodiment of the invention is preferred over the first embodiment because all of the hydraulic circuit components are stationary in relation to the bale press. It will be appreciated, however, that the switch 64 and the connecting wires 65 must be rugged enough to withstand continuous reciprocating movement.

The detection threshold is adjusted in the first two embodiments by modifying the parameters of the spring 58.

The third embodiment shown in FIG. 4 offers the advantage, vis-a-vis the first and second embodiments, of having all of its elements stationary relative to the machine.

The control valve actuator 38 is an electrical coil 39, as in the second embodiment.

The force detector 42 comprises a set of strain gauges mounted on a support arm 68. The strain gauges are placed between the frame 70 of the machine and the motor/reducer 46 which drives the transmission crank 48. It will be understood that the compression force F applied by the plunger on the fodder charge is opposed by reaction forces -F against the motor/reducer 46. The arm 68, or traction member, may extend generally along the center of the compression canal 10 to transmit the reaction forces that directly result from the compression force.

The strain gauges are linked to an electronic control unit 72 which processes the signals received from the gauges and compares the signals to a reference threshold which represents the maximum desired compression force. The control unit 72 is also connected to the control valve coil 39. The control unit 72 energizes (or de-energizes) the control valve coil 39 when the threshold is exceeded, and de-energizes (or energizes) the control valve coil 39 as long as the signal stays below the threshold.

FIG. 5 is a block diagram of a suitable control unit 72. The strain gauges, disposed in bridge configuration, are connected to a signal conditioning and amplification circuit 74. The signal conditioning and amplification circuit 74 produces an output signal wherein the voltage is a function of the tensile force imposed on the traction member 68. The output signal from the conditioning and amplification circuit 74 is fed to one input 75 of a comparater circuit 76. The other input 77 receives an adjustable threshold signal S. The comparator circuit 76 transmits a fixed voltage signal when the signal input from the conditioning and amplification circuit exceeds the threshold signal, and transmits a zero voltage signal when the threshold is not exceeded. The comparator output signal is applied to a switching circuit 78 configured between a power source 62 and the control valve coil to energize or de-energize the control valve coil as a function of the switching circuit input signal.

The detection threshold may be adjusted in this embodiment by adjusting a potentiometer S.

What is claimed is:

1. An apparatus for regulating the density of parallelepipedic fodder bales produced by a bale press, comprising:
    (a) a compression canal having walls wherein said walls comprise at least one pivoting shutter plate capable of exerting variable transversal forces on fodder charges within said canal, said variable transversal forces being caused by a fluid cylinder acting on said at least one shutter plate;
    (b) a main plunger configured within said canal and driven in reciprocating movement by transmission means to produce cyclical compression forces on the fodder in the canal;
    (c) means for detecting said cyclical compression forces and producing a signal corresponding to the level of the compression forces, said means for detecting and producing a signal being configured within said canal;
    (d) hydraulic means for operating said fluid cylinder, comprising a source of pressurized fluid; a main conduit fluidly connecting said source to said fluid cylinder; a branch conduit fluidly connecting said main conduit to a low pressure fluid reservoir; and a control valve configured in said branch conduit capable of stopping and starting the flow of fluid from said main conduit to said low pressure fluid reservoir;
    wherein said control valve is responsive to said signal so that the control valve (i) closes or (ii) remains closed when said signal is less than a predetermined threshold signal so that all of the pressurized fluid flows from the source of pressurized fluid through the main conduit to the fluid cylinder thereby (i) increasing or (ii) maintaining the pressure in the fluid cylinder that acts on the at least one shutter plate to (i) increase or (ii) maintain the variable forces on the fodder charges, and the control valve is responsive to said signal so that the control valve (iii) opens or (iv) remains open when said signal is greater than a predetermined threshold signal so that at least some of the pressurized fluid flows from the source of pressurized fluid through at least part of the main conduit and through the branch conduit to the low pressure fluid reservoir thereby (iii) decreasing or (iv) maintaining the pressure in the fluid cylinder that acts on the at least one shutter plate to (iii) decrease or (iv) maintain the variable forces on the fodder charges.

2. An apparatus as defined in claim 1 wherein said means for detecting is a mechanical device.

3. An apparatus for regulating the density of parallelepipedic fodder bales produced by a bale press, comprising:
    (a) a compression canal having walls wherein said walls comprise at least one pivoting shutter plate capable of exerting variable forces on fodder charges within said canal, said variable forces being caused by a fluid cylinder acting on said at least one shutter plate;
    (b) a main plunger configured within said canal and driven in reciprocating movement by transmission means to produce cyclical compression forces on the fodder in the canal;
    (c) means for detecting said cyclical compression forces and producing a signal corresponding to the level of the compression forces, said means for detecting and producing a signal being configured within said canal;
    (d) hydraulic means for operating said fluid cylinder, comprising a source of pressurized fluid; a main conduit fluidly connecting said source to said fluid cylinder; a branch conduit fluidly connecting said main conduit to a low pressure fluid reservoir; and a control valve configured in said branch conduit capable of stopping and starting the flow of fluid from said main conduit to said low pressure fluid reservoir;
    wherein said control valve is responsive to said signal so that the control valve (i) closes or (ii) remains closed when said signal is less than a predetermined threshold signal so that all of the pressurized fluid flows from the source of pressurized fluid through the main conduit to the fluid cylinder thereby (i)

increasing or (ii) maintaining the pressure in the fluid cylinder that acts on the at least one shutter plate to (i) increase or (ii) maintain the variable forces on the fodder charges, and the control valve is responsive to said signal so that that control valve (iii) opens or (iv) remains open when said signal is greater than a predetermined threshold signal so that at least some of the pressurized fluid flows from the source of pressurized fluid through at least part of the main conduit and through the branch conduit to the low pressure fluid reservoir thereby (iii) decreasing or (iv) maintaining the pressure in the fluid cylinder that acts on the at least one shutter plate to (iii) decrease or (iv) maintain the variable forces on the fodder charges; wherein the control valve comprises a mechanical actuating device and said control valve is mounted on the main plunger, and wherein the means for detecting said cyclical compression forces is eccentrically configured between said main plunger and said transmission means, and said means for detecting is configured in facing relation to said actuating device.

4. An apparatus as defined in claim 3 wherein said means for detecting is a mechanical device.

* * * * *